United States Patent [19]

Gugle et al.

[11] Patent Number: 5,429,467
[45] Date of Patent: Jul. 4, 1995

[54] HIGH TORQUE SCREW AND GROMMET FASTENER ASSEMBLY

[75] Inventors: James E. Gugle, Manhatten; James E. Marion, Bonfield; Duane M. Schultz, Lansing, all of Ill.

[73] Assignee: Illinois Tool Works Inc., Glenview, Ill.

[21] Appl. No.: 260,725

[22] Filed: Jun. 15, 1994

[51] Int. Cl.[6] .................... F16B 37/04; F16B 37/16
[52] U.S. Cl. .................... 411/182; 411/437; 411/508; 411/908
[58] Field of Search .............. 411/182, 437, 508, 509, 411/510, 908, 913, 551, 553

[56] References Cited

U.S. PATENT DOCUMENTS

| | | | |
|---|---|---|---|
| 2,268,576 | 1/1942 | Drewett | 287/52 |
| 2,484,644 | 10/1949 | Puopitch . | |
| 2,820,972 | 1/1958 | Ptak . | |
| 3,104,161 | 9/1963 | Carlson | 29/190 |
| 3,127,625 | 4/1964 | Ruminsky . | |
| 4,338,054 | 7/1982 | Dahl | 411/424 |
| 4,948,314 | 8/1990 | Kuraosaki | 411/182 |
| 5,046,904 | 9/1991 | Malinow | 411/182 X |
| 5,193,961 | 3/1993 | Hoyle et al. | 411/553 |
| 5,222,852 | 6/1993 | Snyder | 411/553 |

FOREIGN PATENT DOCUMENTS 2813749 10/1978 Germany .................... 411/182

*Primary Examiner*—Neill R. Wilson
*Attorney, Agent, or Firm*—T. W. Buckman; J. P. O'Brien

[57] ABSTRACT

A screw and grommet fastener assembly for securing two mating panels together where the grommet absorbs variations in the relative positions of the panels and allows for expansion of a body portion thereof during insertion of the screw to withstand higher torques from screws of different sizes and dimensions without causing damage to the grommet.

6 Claims, 2 Drawing Sheets

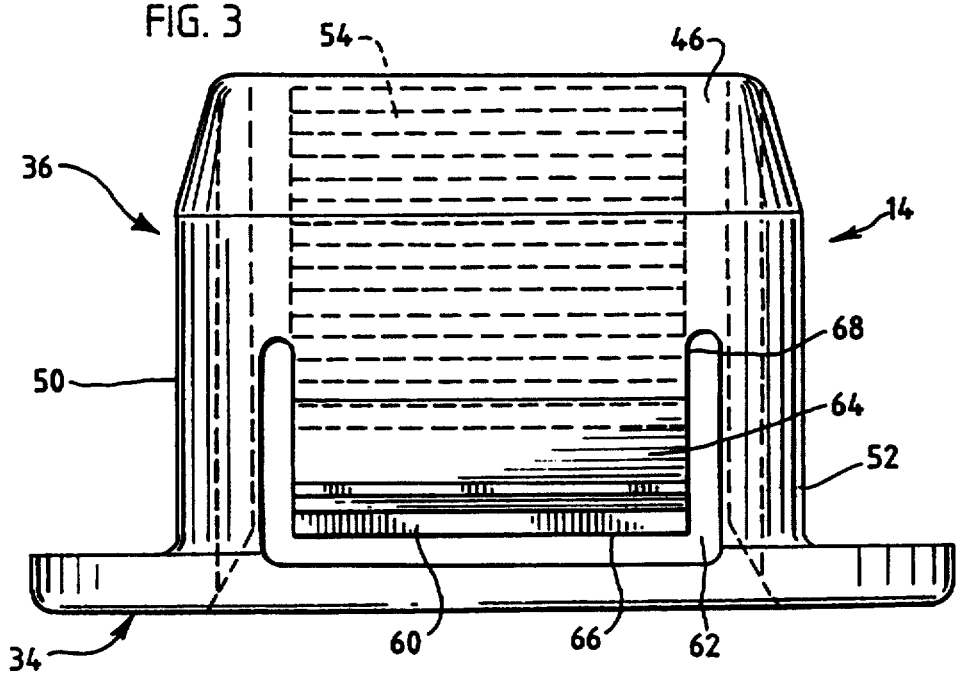
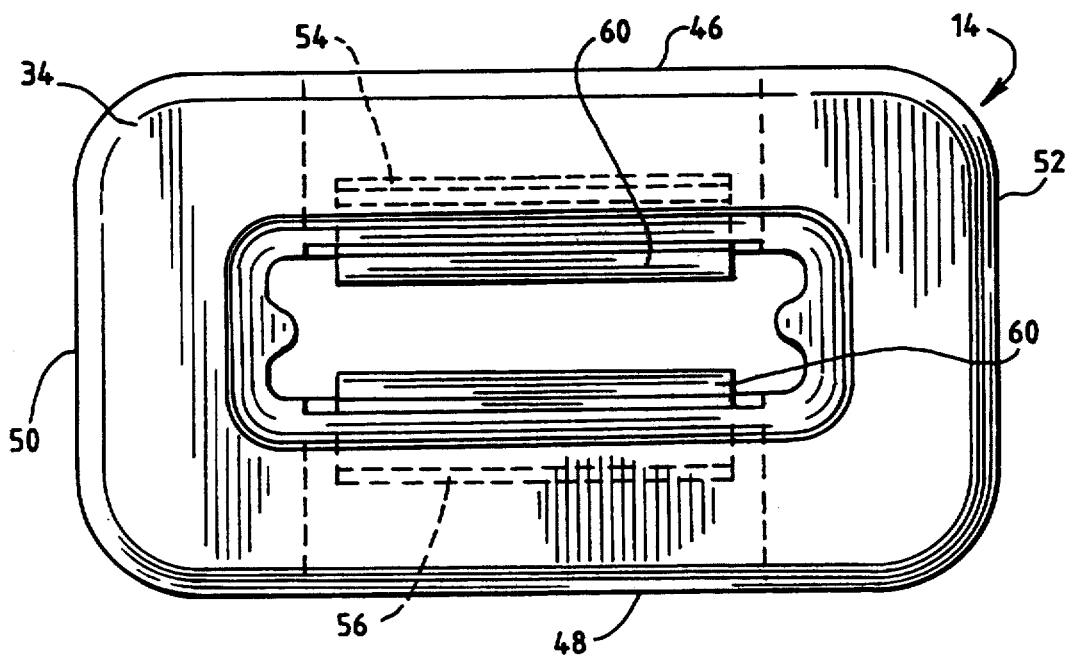

HIGH TORQUE SCREW AND GROMMET FASTENER ASSEMBLY

FIELD OF THE INVENTION

This invention relates generally to fasteners for securing two members together and more particularly, to a screw and grommet assembly having an oblong grommet that is inserted and retained in a fitting hole in a supporting panel, such as a door panel of an automobile, and thereafter receives the screw for mounting a mating panel having a throughhole, such as a decorative lining panel, to the door panel. Upon threaded engagement of the screw within the grommet, the grommet enables relative movement between the panels and is substantially flexible to prevent damage to the grommet from screws of slightly different sizes or that differ dimensionally from a desired specification and are subjected to increased torque.

BACKGROUND OF THE INVENTION

Fasteners for securing two panels or the like together can include a screw and a grommet. The grommet is inserted and retained within an aperture in a base or supporting panel and the shank of the screw is inserted through an aperture in a mating panel and then threadingly engaged within the grommet to secure the two panels together.

In order to retain the grommet within the aperture of the base panel, the base panel typically is captured between a head of the grommet and a shoulder formed on the body of the grommet. Upon insertion of the grommet into the aperture, the shoulders extend through the panel aperture and engage a back side of the panel thereby retaining the grommet thereto.

Existing screw and grommet fasteners typically are designed so that the grommet is relatively inflexible and only can accept a screw of a particular size and having dimensions which fall within a narrow range. Accordingly, if an attempt is made to thread a screw into the grommet having the wrong size or dimensions outside the prescribed range, the screw either will not thread or the insertion torque will force the screw into the grommet and possibly cause the grommet to break.

Screws and grommets can both be formed from metal, plastic or a combination of a metal screw and a plastic grommet, or vice versa. Existing metal grommets typically can withstand screw insertion torques between 25–40 in./lbs. while existing plastic grommets typically only can withstand screw insertion torques between 5-10 in./lbs.

Additionally, during use, variations in the relative positions of the supporting panel and the mating panel occur which are caused by thermal expansion and contraction from changes in temperature. Such variations can cause one or both panels to become disfigured and possibly cause the fastener to fail.

In order to allow for such variations, oblong grommets typically are utilized which allow for expansion and contraction along a line. Such grommets, however, typically do not have much flexibility thereby causing the threads to strip from mis-sized screws under substantially low torque as described above. This particularly is true with a completely inflexible portion of the grommet positioned within the confines of the panel aperture between the head and the shoulder which prevents any expansion of the grommet and frequently will not accept the screw.

It therefore would be desirable to provide a screw and grommet fastener assembly for securing two mating panels together where the grommet allows for variations in the relative positions of the panels and flexing of the grommet body portion during insertion of the screw to accept screws of different sizes and slightly out of dimension and enable higher torques to be applied to the screw without causing damage to the grommet.

SUMMARY OF THE INVENTION

The invention provides a screw and grommet fastener assembly for retaining a mating panel having a throughhole to a supporting panel having an oblong fitting hole where the grommet can withstand substantially high torque from screws of slightly different sizes and dimensions and is adapted to absorb variations in the relative positions of the supporting panel and the mating panel. The assembly includes a screw having desired major and minor helical threads and an oblong grommet for receiving the screw therein.

The grommet includes a head portion and a body portion where the head portion includes a front surface and a back surface and a central opening extends through both the head and body portions. The body portion substantially is rectangular in cross-sectional configuration defined by a first pair of opposing major sides, a second pair of opposing minor sides, a first proximal end connected to the back surface of the head portion and a second distal end extending away from the head portion a predetermined distance.

Two sets of lugs are included with the body portion, one set each on an interior surface of a respective major side for threaded engagement with the screw threads. Each set of lugs includes a predetermined number of lugs where the two sets are staggered with respect to each other and are positioned a predetermined distance away from the proximal end of the body portion of the grommet. The distance is selected to enable outward expansion of the body portion proximate the sets of lugs so that the body portion can withstand substantial torque from screws of different sizes and dimensions without breaking.

BRIEF DESCRIPTION OF THE DRAWINGS

FIG. 3 is a top plan view of the grommet of the invention; and

FIG. 4 is a front elevational view of the grommet of FIG. 3.

DESCRIPTION OF THE PREFERRED EMBODIMENT

Figure 1:
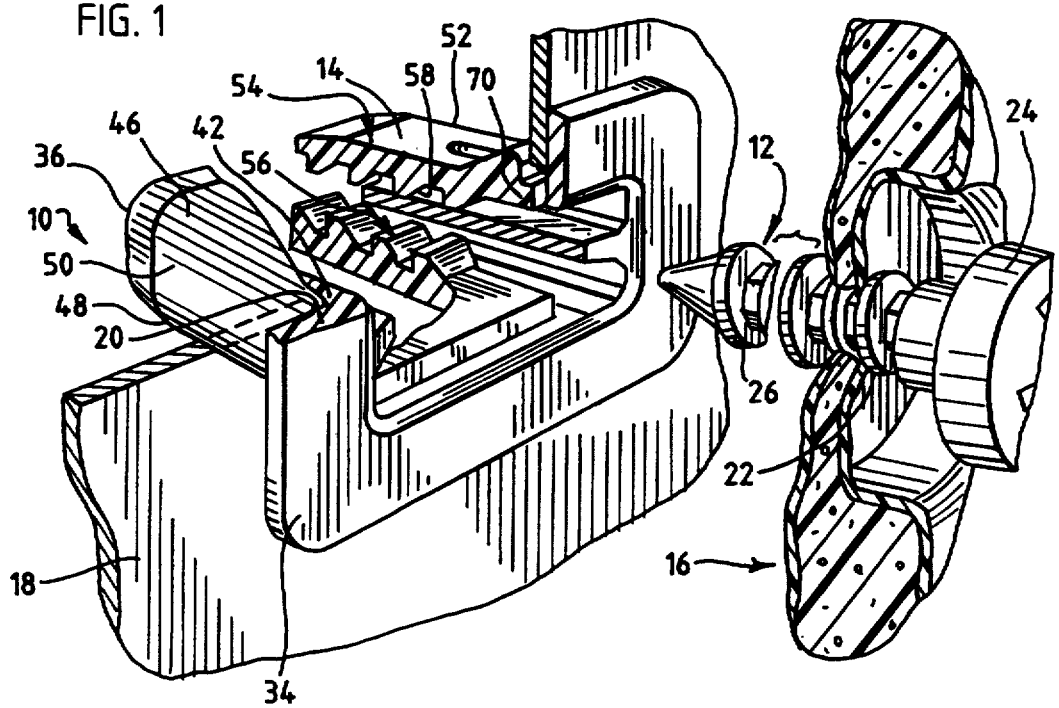
FIG. 1 is a perspective view, in partial section, of the grommet of the invention secured to a base panel with the screw of the invention extending through an aperture in a decorative panel and aligned for insertion within the grommet.

Referring to FIG. 1, a fastener assembly of the present invention is designated generally by the reference numeral 10. The fastener 10 includes a screw 12 and a grommet 14, details of which will be provided herein.

Briefly, in use, the fastener 10 preferably is utilized to secure a decorative lining or cover panel 16 to a supporting or base panel 18, such as a door panel or roof of an automobile. The grommet 14 is inserted and retained within a fitting aperture or hole 20 in the base panel 18 while the screw 12 extends through an aperture or throughhole 22 in the liner 16.

During assembly, the screw 12 preferably is driven by a drive tool (not illustrated) at a predetermined torque. As described in detail below, upon threaded engagement with the grommet 14, the screw 12 is drawn into the grommet 14 until the two panels 16 and 18 are properly secured.

Figure 2:
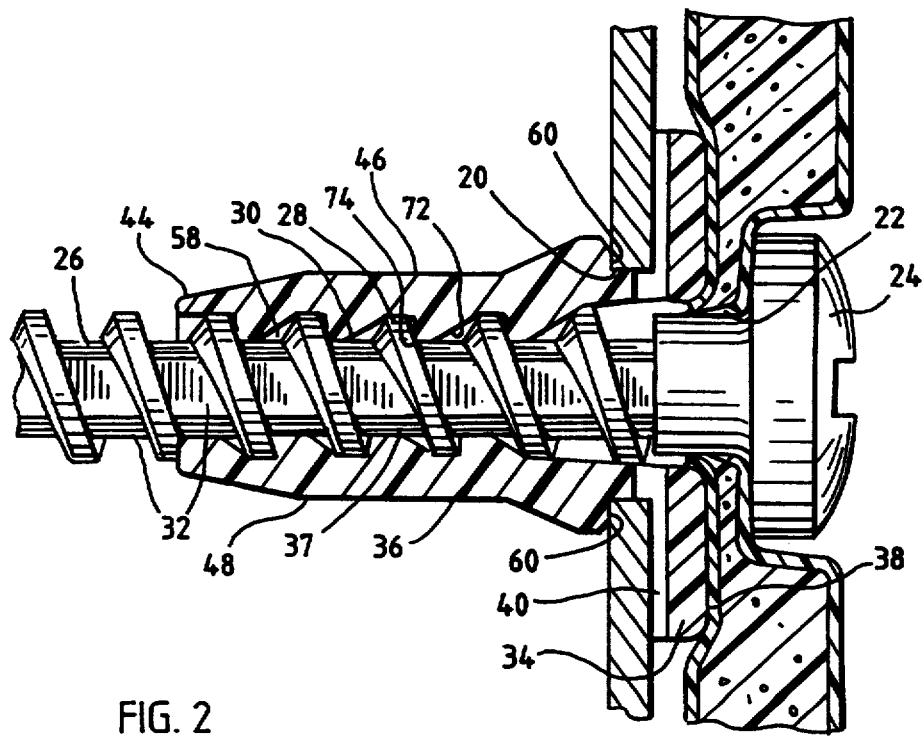
FIG. 2 is a cross-sectional view of the attached panels and the grommet of the invention with the screw inserted therein.

As FIG. 2 illustrates, the screw 12 includes a head 24 and a shank 26. The shank 26 includes major threads 28 and minor threads 30. In order to prevent the screw 12 from backing out after it is assembled to the grommet 14, the minor threads 30 include flats 32 which engage portions of the grommet 14 as described below.

The grommet 14 includes a head portion 34, a body portion 36 and a central opening 37 extending therethrough, all three of which are substantially oblong in configuration. The head portion 34 includes a front surface 38 and a back surface 40 facing the body portion 36.

Preferably, the grommet 14 is formed from plastic, but can vary. Most preferably, the grommet 14 is formed from a plastic reinforced with a ceramic and/or glass fibers, such as that sold by Thermofil, Inc. of Brighton, Mich. under the name ESBRID.

As FIG. 1 illustrates, the body portion 36 includes a first proximal end 42 integrally formed with the back surface 40 of the head portion 34 and a distal end 44 extending outwardly away from the head portion 34 a predetermined distance. The body portion 36 is defined by a first pair of opposed major sides 46 and 48 and a second pair of opposed minor sides 50 and 52.

In order to threadingly engage the threads of the screw 12, each major side 46 and 48 of the body portion 36 includes a set 54 and 56, respectively, of engagement lugs 58. Each lug 58 preferably is perpendicular to a central axis of the grommet 14 and substantially parallel to one another.

Additionally, the two sets 54 and 56 of lugs 58 are staggered with respect to each other and can include the same or different number of lugs 58. In the embodiment illustrated, the set 54 includes five lugs 58 and the set 56 includes four lugs 58, but the particular number can vary.

As FIG. 3 illustrates, the set 54 of lugs 58 starts at a distance "d" from the head 34 of the grommet 14. Accordingly, the threads of the screw 12 can be inserted within the grommet 14 through the distance "d" until they engage the first lug 58. This provides the desired flexibility of the grommet 14 as described in detail below.

In order to secure the grommet 14 to the base panel 18, the major sides 46 and 48 of the body portion 36 include a shoulder portion 60 formed thereon. Upon insertion of the body portion 36 through the aperture 20 of the base panel 18, the shoulders 60 engage the back surface 40 of the head 34 of the grommet 14.

As FIG. 3 illustrates, to increase the flexibility of the body portion 36 of the grommet 14, a U-shaped cut out 62 can be included on each major side 46 and 48. Thus, each cut out 62 defines a flexible leg, prong or "window" 64 having a distal end 66 proximate the head 34 and a proximal end 68 positioned a predetermined distance away from the head 34 along the body 36.

The shoulders 60 and lugs 58 preferably are confined within the width of the legs 64. Additionally, the lugs 58 do not extend completely to the distal end 66 of the legs 64, but are spaced from the distal end 66 a predetermined distance selected along with the size and shape of the legs 64 and cut outs 62 to provide a desired amount of flex, which can vary depending on the particular application.

In use, as FIG. 1 illustrates, the grommet 14 is inserted within the aperture 20 of the base panel 18. The shoulders 60 of the body 36 engage the back side of the base panel 18 with ribs 70 of the legs 64 being contained within the confines of the aperture 20.

The distal ends 66 of each leg 64 are restrained from moving outward due to engagement of the ribs 70 with the inside surface of the aperture 20. Thus, the lugs 58 are positioned a distance away from the distal ends 66 to enable outward flexing at the proximal end of each leg 64. This provides outward bulging of the body portion 36 proximate its midpoint.

The screw 12 is inserted through the aperture 22 in the liner panel 16 and within the central opening 37. Initially, the major threads 28 do not engage the distal ends 66 of the legs 64. The major threads 28, rather, are inserted within the central opening 37 until they abut the lugs 58.

Preferably, the screw 12 is rotated during insertion by a driving tool (not illustrated) at a desired torque. When the rotating major threads 28 contact the lugs 58, they ride up ramped portions 72 of each lug 58 and outwardly flex the legs 64 until they clear a back side 74 of each lug 58.

Upon continued driving and insertion of the screw 12 within the grommet 14, the screw attains its fully inserted position as illustrated in FIG. 2. In this position, the major threads 28 within the body 34 are seated behind a respective lug 58 and the lugs 58 are in contact with the flats 32 of the minor threads 30 to resist backing out of the screw 12.

It is to be noted that due to the particular design of the grommet 14, the grommet 14 can accommodate a rather large range of tolerances of the screw 12. In fact, a particular grommet 14 can accept screws 12 of more than one size.

For example, the grommet 14 can be dimensioned to accommodate a No. 8 or a No. 10 size screw 12, due to its flexibility and material. Typically, if a screw 12 having a size greater than the recommended size grommet is inserted therein, the screw 12 will either not thread within the grommet or the torque from the driving tool will force the screw 12 into the grommet and break it. Such existing plastic grommets typically only can withstand a torque of about 5–10 in./lbs. before breakage will occur.

Accordingly, the grommet 14 of the present invention provides enough flexibility to enable it to withstand the high torques of the driving tools, which can be in the range of 25–40 in./lbs. This torque corresponds with the common torques provided during assembly with metal grommets. Accordingly, the grommet 14 of the present invention can be utilized with existing driving tools.

Modifications and variations of the present invention are possible in light of the above teachings. It is to be understood that within the scope of the claims the invention may be practiced other than specifically described.

We claim:

1. A screw and grommet fastener assembly for retaining a mating panel having a throughhole to a supporting panel having an oblong fitting hole where the grommet can withstand substantially high torque from screws of slightly different sizes and dimensions and is adapted to absorb variations in the relative positions of the supporting panel and the mating panel, said assembly comprising:

a screw having desired major and minor helical threads;

an oblong grommet having a head portion, a body portion and a central oblong opening extending through said head portion and said body portion, said head portion including a front surface and a back surface, said body portion being substantially rectangular in cross-sectional configuration defined by a first pair of opposing major sides and a second pair of opposing minor sides, a first proximal end connected to said back surface of said head portion and a second distal end extending away from said head portion a predetermined distance; and two sets of lugs, one set each positioned on said opposing major sides of said body portion for threading engagement with said screw threads, each set including a predetermined number of lugs, being staggered with respect to each other and being positioned a predetermined distance away from said proximal end of said body portion, said predetermined distance selected to enable outward flexing of said body portion proximate said lugs so that said grommet can withstand substantial torque from screws of different sizes and dimensions without breaking.

2. The fastener as defined in claim 1 wherein each of said first pair of opposing major sides include a flexible leg member having a distal end proximate said head portion and a proximal end positioned a predetermined distance therefrom, said two sets of lugs being positioned proximate said proximal end of each leg member and extending toward said distal end of said body portion.

3. The fastener as defined in claim 2 wherein said distal end of said legs of said body portion engage an interior of said fitting hole to restrict outward expansion of said body portion proximate said distal end of said legs.

4. The fastener as defined in claim 1 wherein said minor threads are formed with a plurality of flats for engagement with said lugs to resist backing out of the screw during use.

5. The fastener as defined in claim 1 including a pair of shoulders, one each positioned on an exterior surface of each of said major sides of said body portion for capturing said supporting panel between said shoulders and said head portion.

6. The fastener as defined in claim 1 wherein said grommet is molded from a plastic material including at least one of a ceramic and glass fibers.

* * * * *